US012594895B2

(12) United States Patent
Yasuda

(10) Patent No.: US 12,594,895 B2
(45) Date of Patent: Apr. 7, 2026

(54) VEHICLE-MOUNTED APPARATUS, PROGRAM, AND INFORMATION PROCESSING METHOD

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Koji Yasuda, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 130 days.

(21) Appl. No.: 18/714,872

(22) PCT Filed: Nov. 21, 2022

(86) PCT No.: PCT/JP2022/042937
§ 371 (c)(1),
(2) Date: May 30, 2024

(87) PCT Pub. No.: WO2023/106073
PCT Pub. Date: Jun. 15, 2023

(65) Prior Publication Data
US 2025/0033585 A1      Jan. 30, 2025

(30) Foreign Application Priority Data
Dec. 8, 2021     (JP) ................................. 2021-199440

(51) Int. Cl.
B60R 16/023          (2006.01)

(52) U.S. Cl.
CPC ................................ B60R 16/0231 (2013.01)

(58) Field of Classification Search
CPC ....... B60R 16/0231; B60R 16/02; G06F 3/00; G06F 13/10; G06F 13/14
See application file for complete search history.

(56) References Cited

U.S. PATENT DOCUMENTS

| | | | |
|---|---|---|---|
| 2001/0022456 A1* | 9/2001 | Kitagawa ............... | B62D 25/04 296/187.12 |
| 2002/0043418 A1* | 4/2002 | Lee ......................... | B60R 21/38 180/274 |

(Continued)

FOREIGN PATENT DOCUMENTS

| | | |
|---|---|---|
| JP | 2017-224926 A | 12/2017 |
| WO | 2020-255760 A1 | 12/2020 |

OTHER PUBLICATIONS

International Search Report, Application No. PCT/JP2022/042937, mailed Feb. 14, 2023. ISA/Japan Patent Office.

*Primary Examiner* — Behrang Badii
(74) *Attorney, Agent, or Firm* — Honigman LLP

(57)          ABSTRACT

A vehicle-mounted apparatus is mounted in a vehicle and is connected to a plurality of actuators. The vehicle-mounted apparatus includes: a control unit for generating control signals for controlling the actuators; an output processing unit for outputting the control signals, which have been generated by the control unit, via signal pins to which the plurality of actuators are connected, and at least one internal pin that connects the control unit and the output processing unit and transmits the control signals, wherein the internal pins are fewer in number than the signal pins.

10 Claims, 4 Drawing Sheets

(56) References Cited

U.S. PATENT DOCUMENTS

2004/0236873 A1* 11/2004 Kasame ............. G06F 15/7867
                                                     710/1
2008/0048849 A1*  2/2008 Li ........................ G01S 15/931
                                                     340/435

* cited by examiner

| VMID | Program name | Allocated time | Signal pin number | Actuator name |
|------|-------------|---------------|------------------|---------------|
| 1 | SN-ABC-0120 | t1 | 1 | xxxx |
| 2 | SN-XCC-9999 | t2 | 2 | yyyy |
| 3 | .... | .... | .... | .... |
| . | .... | .... | .... | .... |

VEHICLE-MOUNTED APPARATUS, PROGRAM, AND INFORMATION PROCESSING METHOD

CROSS-REFERENCE TO RELATED APPLICATIONS

This application is the U.S. national stage of PCT/JP2022/042937 filed on Nov. 21, 2022, which claims priority of Japanese Patent Application No. JP 2021-199440 filed on Dec. 8, 2021, the contents of which are incorporated herein.

TECHNICAL FIELD

The present disclosure relates to a vehicle-mounted apparatus, a program, and an information processing method.

BACKGROUND

A vehicle is equipped with a body ECU (Electronic Control Unit), which is a vehicle-mounted ECU that centrally controls equipment fitted to the vehicle body, such as a wiper driving apparatus, lighting apparatuses inside and outside the vehicle, door locking apparatuses, and power windows (see, for example, JP 2017-224926A). The wiper driving apparatus disclosed in JP 2017-224926A includes a vehicle-mounted ECU (or "body ECU") and is driven by a control program that has been applied to the vehicle-mounted ECU.

In the vehicle-mounted ECU according to JP 2017-224926A, when a plurality of actuators are connected to the vehicle-mounted ECU, no consideration is made of how to efficiently control signal pins on which signals transmitted to the plurality of actuators flow from the vehicle-mounted ECU.

It is an object of the present disclosure to provide a vehicle-mounted apparatus and the like that efficiently control, when a plurality of actuators are connected to the vehicle-mounted apparatus, signal pins on which signals transmitted to the plurality of actuators flow from the vehicle-mounted apparatus.

SUMMARY

A vehicle-mounted apparatus according to an aspect of the present disclosure is a vehicle-mounted apparatus that is mounted in a vehicle and is connected to a plurality of actuators, the vehicle-mounted apparatus including: a control unit for generating control signals for controlling the actuators; an output processing unit for outputting the control signals, which have been generated by the control unit, via signal pins to which the plurality of actuators are connected, and at least one internal pin that connects the control unit and the output processing unit and transmits the control signals, wherein the internal pins are fewer in number than the signal pins.

Advantageous Effects

According to an aspect of the present disclosure, it is possible to provide a vehicle-mounted apparatus and the like that efficiently control, when a plurality of actuators are connected to the vehicle-mounted apparatus, signal pins on which signals transmitted to each of the plurality of actuators flow from the vehicle-mounted apparatus.

DETAILED DESCRIPTION OF PREFERRED EMBODIMENTS

Figure 1:
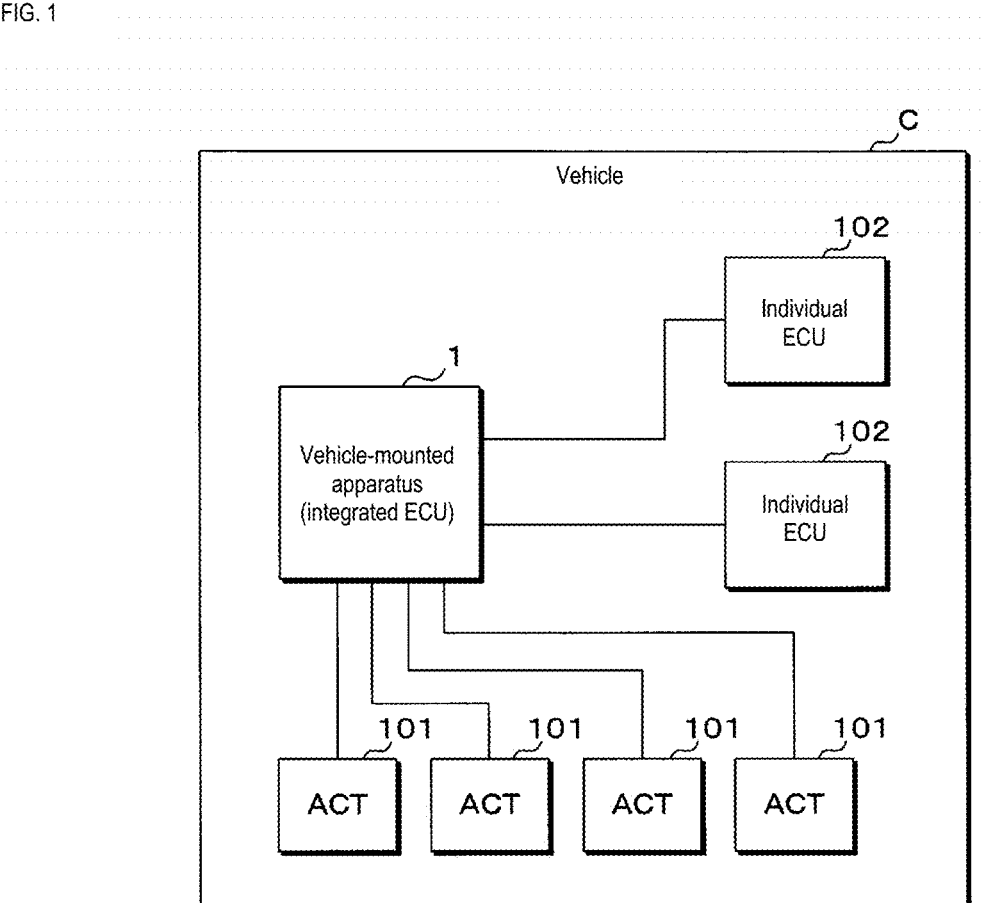
FIG. 1 is a schematic diagram depicting an example system configuration of a vehicle-mounted system according to a first embodiment.

Several embodiments of the present disclosure will first be listed and described in outline. Note that the embodiments described below may also be freely combined, at least in part.

A vehicle-mounted apparatus according to an aspect of the present disclosure is a vehicle-mounted apparatus that is mounted in a vehicle and is connected to a plurality of actuators, the vehicle-mounted apparatus including: a control unit for generating control signals for controlling the actuators; an output processing unit for outputting the control signals, which have been generated by the control unit, via signal pins to which the plurality of actuators are connected, and at least one internal pin that connects the control unit and the output processing unit and transmits the control signals, wherein the internal pins are fewer in number than the signal pins.

In this aspect, the vehicle-mounted apparatus includes the control unit and the output processing unit that are connected so as to be capable of communication by the internal pins, and the number of signal pins provided on the output processing unit is larger than the number of internal pins. That is, although the number of signal pins will increase in keeping with the number of actuators connected to the vehicle-mounted apparatus, by setting the number of internal pins that connect thee control unit and the output processing unit as one, for example, it is possible to make the number of internal pins lower than the number of signal pins. Even when a plurality of actuators are individually connected to a plurality of signal pins, the control unit outputting control signals to the output processing unit from only the internal pins will result in the control signals being output from the appropriate signal pins by the output processing unit. By doing so, even when a plurality of actuators are connected to the vehicle-mounted apparatus, it is sufficient for the control unit that generates control signals for each of the plurality of actuators to output the control signals from the internal pin, which means that processing by the control unit can be carried out efficiently. Since the output processing unit outputs the control signals acquired from the control unit from the appropriate signal pins, it is possible to efficiently control the signal pins through which signals transmitted to each of the plurality of actuators flow.

In the vehicle-mounted apparatus according to an aspect of the present disclosure, the output processing unit acquires the control signals output from the control unit via the internal pins, and the output processing unit outputs an acquired control signal from the signal pin to which an actuator, which is an output destination of the control signal, is connected.

In this aspect, the output processing unit outputs, in accordance with the control signal output from the control unit via the internal pins, from a signal pin to which an actuator that is an output destination of the control signal is connected. That is, the output processing unit functions as a switching circuit that switches the connections between, for example, one internal pin and a signal pin, out of a plurality of signal pins, to which an actuator that is an output destination of a control signal is connected. Accordingly, the internal pin and the signal pin to which the actuator that is the output destination of the control signal is connected can be logically or physically connected and disconnected, and the connection state between the internal pin and the signal pins can be switched. The control signal output from the control unit is, for example, a high-level signal or a low-level signal, and when a high-level signal has been output from the control unit, a high-level signal is also output from the signal pin to which the actuator that is the output destination of the control signal is connected. When a low-level signal has been output from the control unit, a low-level signal is also output from the signal pin. By doing so, even when a plurality of actuators are connected to the vehicle-mounted apparatus, it is possible to efficiently control the signal pins on which signals to be transmitted to the plurality of actuators flow.

The vehicle-mounted apparatus according to an aspect of the present disclosure further includes a storage unit for storing a plurality of programs, which individually correspond to the plurality of actuators, and a virtualized operating system, which is launched by the control unit, wherein the control unit generates a plurality of virtual environments by launching the virtualized operating system, executes the plurality of programs with the generated plurality of virtual environments as operating environments, and outputs the control signals that have been generated by the plurality of programs.

In this aspect, a storage area that can be accessed by the control unit of the vehicle-mounted apparatus, such as a storage unit of the vehicle-mounted apparatus, stores a plurality of programs that individually correspond to the plurality of actuators, and a virtualized operating system, such as a hypervisor, to be launched by the control unit. In this case, the control unit functions as a VM management unit (or "VM control panel") that manages the virtualized operating system. The control unit generates a plurality of virtual environments (or "virtual machines" (VM)) by launching the virtualized operating system, with programs being executed in each of these generated virtual environments. By doing so, the respective programs are executed in mutually different virtual environments, so that the programs can be prevented from interfering with each other.

In the vehicle-mounted apparatus according to an aspect of the present disclosure, the control unit switches an allocation of the internal pins between the plurality of virtual environments, and outputs a control signal generated by a program executed in a virtual environment to which the internal pins have been allocated.

In this aspect, the control unit that functions as a VM management unit of the virtualized operating system switches the allocation of the internal pins between the plurality of virtual environments as examples periodically or based on an allocation timetable that is set in advance. This means that it is possible to prevent conflicts regarding access to the internal pins between programs that are running in the respective virtual environments. As one example, even when the plurality of programs to be executed by the control unit of a vehicle-mounted apparatus are a collection or integration of individual programs that were conventionally executed by a plurality of vehicle-mounted ECUs, by executing the collected programs by running the respective programs in virtual environments that act as separate operating environments, mutual interference between the programs can be prevented. In addition, when control signals generated by individual programs are output, by using internal pins that are similar to those used when the conventional vehicle-mounted ECUs execute the programs, it is possible to reuse programs that have the internal pins as an output destination in this vehicle-mounted apparatus without modifying the programs. As mentioned above, the control signals generated by the programs executed by the control unit, that is, the programs executed in each virtual environment, and output to the output processing unit via the internal pins are output by the output processing unit from the signal pins connected to the actuators that are the transmission destinations of the control signals. Accordingly, it is possible to integrate a plurality of programs and implement the programs in a single vehicle-mounted apparatus without modifying programs that have been reused from a plurality of vehicle-mounted ECUs or the like.

In the vehicle-mounted apparatus according to an aspect of the present disclosure, the control unit outputs virtual environment information which indicates a virtual environment to which the internal pins are allocated, and the output processing unit identifies the signal pin that is to output the acquired control signal based on the virtual environment information output from the control unit, and outputs the control signal from the identified signal pin.

In this aspect, the control unit that functions as the VM management unit of the virtualized operating system outputs virtual environment information, such as VMID (that is, the UUID of a virtual machine) indicating the virtual environment to which the internal pin is allocated, to the output processing unit. The program to be executed and the signal pin to which an actuator to be controlled by the program is connected are associated with each other for this virtual environment information (VMID), and are stored in a storage unit for example as data (or a "VMID table") in table format. The output processing unit identifies the signal pin (or the number of the signal pin) that outputs the control signal from the internal pin by acquiring the virtual environment information (VMID) indicating the virtual environment to which the internal pin is currently allocated, and outputs the control signal from the identified signal pin. In this way, by identifying the signal pin that outputs the control signal based on the virtual environment information output from the control unit, it is possible to synchronize and link a management process of the virtual environments by the control unit and a switching process by the output processing unit that identifies a signal pin and switches the connections between the identified signal pin and the internal pin.

In the vehicle-mounted apparatus according to an aspect of the present disclosure, the output processing unit holds an output state of the control signal from the identified signal pin based on the virtual environment information.

In this aspect, when the output processing unit has output a control signal from the identified signal pin based on the acquired virtual environment information, the output state of the control signal is held or maintained until the next time virtual environment information corresponding to the identified signal pin is acquired. By doing so, the output state of a control signal from a signal pin is maintained even if the signal pin that is logically or physically connected to the internal pin is switched, so that it is possible to continue the control of the actuator connected to the signal pin using the control signal whose output state is maintained.

In the vehicle-mounted apparatus according to this aspect of the present disclosure, a second internal pin for transmitting the virtual environment information is provided between the control unit and the output processing unit.

In this aspect, since the internal pin through which a control signal to be transmitted to an actuator flows and a second internal pin for transmitting the virtual environment information are provided between the control unit and the output processing unit, during communication between the control unit and the output processing unit, it is possible to prevent conflicts between the control signals and the virtual environment information.

In the vehicle-mounted apparatus according to an aspect of the present disclosure, the output processing unit is composed of a hardware processing unit including a logic circuit.

In this aspect, since the output processing unit is configured as a hardware processing unit using a logic circuit such as an ASIC (application specific integrated circuit) or an FPGA (field-programmable gate array), it is possible, compared to a software processing unit that uses a microcomputer or the like, to perform processing related to switching of connections between the internal pin and the signal pins at high speed.

In the vehicle-mounted apparatus according to an aspect of the present disclosure, the signal pins or the internal pins are composed of general purpose inputs/outputs (GPIO).

In this aspect, the signal pins provided in the output processing unit include GPIO (general purpose inputs/outputs). The internal pins may also be composed of GPIO. By inputting and outputting signals using GPIO in this manner, the control unit that executes the programs can directly control the high and low levels of the control signals.

A program according to an aspect of the present disclosure is a program that causes a computer, which is mounted in a vehicle, is connected to a plurality of actuators, and includes a control unit for generating control signals for controlling the actuators, an output processing unit for outputting the control signals, which have been generated by the control unit, via signal pins to which the plurality of actuators are connected, and internal pins that connect the control unit and the output processing unit, transmit the control signals, and are fewer in number than the signal pins, to execute processing, the processing including: causing the control unit to output the control signals via the internal pins; and causing the output processing unit to output a control signal acquired via the internal pins from the signal pin to which an actuator, which is an output destination of the control signal, is connected.

According to this aspect, it is possible to provide a program that causes a computer to function as a vehicle-mounted apparatus that efficiently controls signal pins on which signals transmitted to the plurality of actuators flow.

An information processing method according to an aspect of the present disclosure is a method for causing a computer, which is mounted in a vehicle, is connected to a plurality of actuators, and includes a control unit for generating control signals for controlling the actuators, an output processing unit for outputting the control signals, which have been generated by the control unit, via signal pins to which the plurality of actuators are connected, and internal pins that connect the control unit and the output processing unit, transmit the control signals, and are fewer in number than the signal pins, to execute processing, the processing including: causing the control unit to output the control signals via the internal pins;

and causing the output processing unit to output a control signal acquired via the internal pins from the signal pin to which an actuator, which is an output destination of the control signal, is connected.

In this aspect, it is possible to provide an information processing method that causes a computer to function as a vehicle-mounted apparatus that efficiently controls signal pins through which signals transmitted to each of a plurality of actuators flow.

DETAILED DESCRIPTION OF EMBODIMENTS OF THE PRESENT DISCLOSURE

Preferred embodiments of the present disclosure will now be described in detail with reference to the attached drawings. A vehicle-mounted system S according to an embodiment of the present disclosure is described below with reference to the drawings. Note that the present disclosure is not limited to the illustrated examples and is instead indicated by the claims and intended to include all possible changes within the meaning and scope of the claims and their equivalents.

First Embodiment

Figure 2:
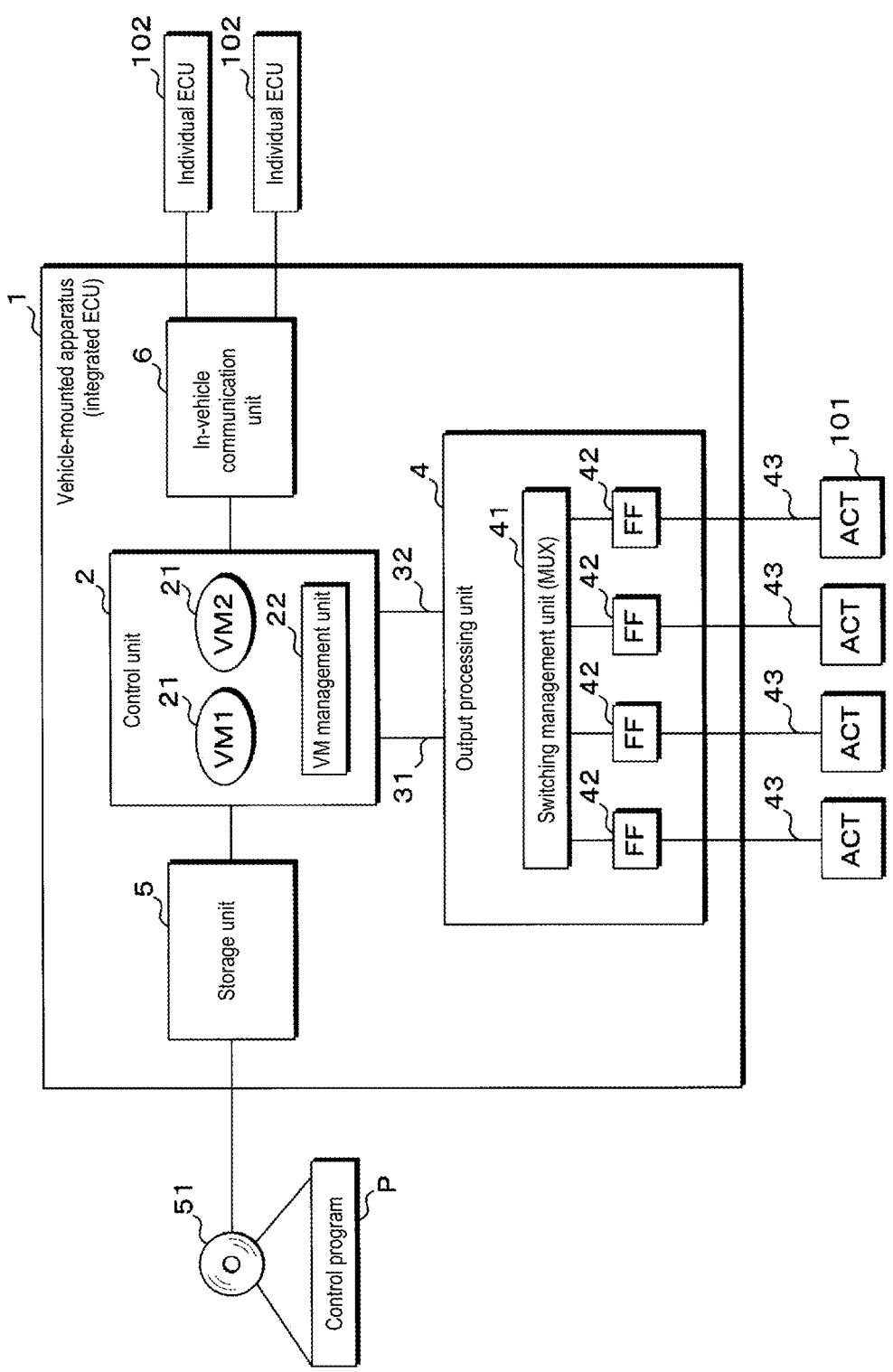
FIG. 2 is a block diagram depicting an example internal configuration of a vehicle-mounted apparatus (or "integrated ECU") included in a vehicle-mounted system.

Several embodiments of the present disclosure will now be described based on the attached drawings. FIG. 1 is a schematic diagram depicting an example system configuration of a vehicle-mounted system S according to a first embodiment. FIG. 2 is a block diagram depicting an example internal configuration of a vehicle-mounted apparatus 1 (or "integrated ECU") included in the vehicle-mounted system S. The vehicle-mounted system S is configured with the vehicle-mounted apparatus 1 (or "integrated ECU") installed in a vehicle C as the principal apparatus. A plurality of actuators 101 are connected to the vehicle-mounted apparatus 1, and it is possible to further connect individual ECUs 102 to the vehicle-mounted apparatus 1. These individual ECUs 102 may be disposed in different areas of the vehicle C, and may be connected to various sensors or the like. As one example, an individual ECU 102 acquires (receives) a signal (or "input signal") that has been output from a sensor and transmits a request signal generated based on the acquired input signal to the vehicle-mounted apparatus 1.

The vehicle-mounted apparatus 1 generates and outputs control signals to the plurality of actuators 101 that are directly connected to the vehicle-mounted apparatus 1 itself, and as one example is an integrated ECU that functions as a central control apparatus, such as a vehicle computer. The vehicle-mounted apparatus 1 (or "integrated ECU") and the individual ECUs 102 are connected via a vehicle-mounted network so as to be capable of communication, and the vehicle-mounted apparatus 1 may generate and output control signals to be sent to the plurality of actuators 101 in response to request signals transmitted from the plurality of individual ECUs 102.

The vehicle-mounted apparatus 1 includes a control unit 2, a storage unit 5, an in-vehicle communication unit 6, and an output processing unit 4. The control unit 2, the storage unit 5, and the in-vehicle communication unit 6 are connected via an internal bus or the like so as to be capable of communication.

The control unit 2 and the output processing unit 4 are connected so as to be capable of communicating via an internal pin 31 and a second internal pin 32 composed, for example, of general-purpose inputs/outputs (GPIO). Although described in detail later, the internal pin 31 corresponds to a data signal pin to which a control signal generated by a program executed in a virtual environment 21 is output, and is connected to a signal pin 43 that is identified according to a virtual environment 21. The second internal pin 32 corresponds to a control pin for controlling the output processing unit 4, to which virtual environment 21 information output by the VM management unit 22 is output. The internal pin 31 and the second internal pin 32 are not limited to pin-shaped conductors, and may be constructed of terminals, lands such as conductive patterns provided on a circuit board, or conductors such as communication lines.

The storage unit 5 is composed of a volatile memory element, such as a RAM (Random Access Memory), or a non-volatile memory element such as a ROM (Read Only Memory), an EEPROM (Electrically Erasable Programmable ROM), or a flash memory, or any combination of such storage devices. The storage unit 5 stores in advance a control program P (or program product) and data which is referred to during processing. The control program P (or program product) stored in the storage unit 5 may be prepared by storing a control program P (or program product) that has been read from a recording medium 51 capable of being read by the vehicle-mounted apparatus 1. Alternatively, the control program P (or program product) may be downloaded from an external computer, not illustrated, connected to a communication network, also not illustrated, and stored in the storage unit 5. As one example, the control program P includes a program (application)

for controlling the various actuators 101, such as a car air conditioner or door mirrors. In addition, a management table (or "VMID table") for controlling and managing a virtualized operating system, such as a hypervisor, and a plurality of virtual environments 21 (or virtual machines ("VM")) generated by such virtualized operating system is stored in the storage unit 5.

The control unit 2 is composed of a CPU (Central Processing Unit), an MPU (Micro Processing Unit), or the like, and performs various control processes and arithmetic processes by reading and executing the control program P and data stored in advance in the storage unit 5. The control unit 2 includes, as examples, a single-core single CPU, a single-core multi-CPU, a multi-core single CPU, and a multi-core multi-CPU. The control unit 2 may be constructed of a microcomputer in which a CPU, the storage unit 5, and the like have been packaged. Note that in the present embodiment, it is possible to use a microcomputer which is not equipped with a memory management unit (MMU).

By launching a virtualized operating system, such as a hypervisor, stored in the storage unit 5, the control unit 2 functions as a VM management unit 22 (or "control panel") that performs an overall management function for a virtualized operating system. The control unit 2 that functions as this VM management unit 22 generates a plurality of virtual environments 21 (such as VM1 and VM2) based on a VMID table that has been set in advance for managing the virtual environments 21. The control unit 2 (or "VM management unit 22") manages the virtual environments 21 that have been generated by allocating usage time (or "time slices") of physical resources, such as the internal pin 31 and the CPU, to these virtual environments 21. Programs for controlling the various actuators 101 are individually executed with the generated virtual environments 21 as their operating environments. By doing so, the respective programs are executed in mutually different virtual environments 21, which makes it possible to prevent the programs from interfering with each other.

The in-vehicle communication unit 6 is an input/output interface that uses CAN (Controller Area Network) or Ethernet (registered trademark) communication protocol, for example, with the control unit 2 performing mutual communication with the individual ECUs 102 and the like that are connected to the vehicle-mounted network via the in-vehicle communication unit 6.

The output processing unit 4 includes a switching management unit 41, state holding units 42, and a plurality of signal pins 43, and as one example is configured as a hardware processing unit using a logic circuit such as an ASIC (Application Specific Integrated Circuit), a PLD (Programmable Logic Device), or an FPGA (Field-Programmable Gate Array). A VMID table may be stored in a ROM included in an ASIC, an FPGA, or the like. The output processing unit 4 and the control unit 2 are connected by the internal pin 31 and the second internal pin 32 so as to be capable of communication. The actuators 101 are connected to each of the plurality of signal pins 43 provided in the output processing unit 4.

The switching management unit 41 is constructed, for example, of a multiplexer, and in keeping with the virtual environment 21 information (such as the VMID) output from the control unit 2 that functions as the VM management unit 22, the switching management unit 41 physically or logically connects the internal pin 31 and a signal pin 43 corresponding to a VMID. The virtual environment 21 information output from the control unit 2 includes a VMID indicating an identification number of a virtual environment 21 (VM) or the number of a signal pin 43 (or "signal pin number"). As described above, the switching management unit 41 may refer to a VMID table stored in the ROM of an ASIC or the like to identify the signal pin 43 to be connected to the internal pin 31 based on the virtual environment 21 information. By doing so, in keeping with switching control by the control unit 2 (specifically the "VM management unit 22"), the switching management unit 41 connects the internal pin 31 and a signal pin 43 to which an actuator 101, which is the output destination of a control signal generated and output by a program executed in the virtual environment 21 (VM) to which the internal pin 31 have been allocated, is connected.

The plurality of signal pins 43 protrude from the switching management unit 41 and are constructed for example by GPIO. The actuators 101 are connected to the corresponding signal pins 43 directly or via a harness, such as a signal line.

Each of the plurality of signal pins 43 may be assigned a signal pin number to uniquely identify that signal pin 43. The signal pins 43 are not limited to pin-shaped conductors, and may be constructed for example by terminals, lands such as conductive patterns provided on a circuit board, or conductors such as communication lines.

The state holding units 42 are constructed for example of flip-flops, which are provided corresponding to each signal pin 43. The state holding units 42 may be interposed between the respective signal pins 43 and the switching management unit 41. The state holding units 42 are configured to hold the output state of the control signal output from the internal pin 31 when a signal pin 43 and the internal pin 31 were connected by the switching management unit 41. That is, when a signal pin 43 and the internal pin 31 are connected by the switching management unit 41 and a high-level control signal has been output from the internal pin 31, the state holding unit 42 will hold the state in which the high-level control signal is output even after the connection between that signal pin 43 and the internal pin 31 has been released, that is, after that signal pin 43 and the internal pin 31 have been physically or logically disconnected. By doing so, even after the internal pin 31 has been switched by the switching management unit 41 from being connected to a first signal pin 43 to another signal pin 43, the output state of the control signal output from the first signal pin 43 can be maintained.

Although the output processing unit 4 has been described in the present embodiment as being configured as a hardware processing unit using a logic circuit such as an ASIC, the output processing unit 4 is not limited to this. Like the control unit 2, the output processing unit 4 may be configured as a software processing unit using a microcomputer or the like, which includes a CPU or the like. Also, although the control unit 2 (or specifically the virtual environment 21) that executes a program is described as directly controlling the high or low level of the control signal through communication between the control unit 2 and the output processing unit 4 using the internal pin 31 such as GPIO, the control unit 2 is not limited to this. It is also possible for the control unit 2 and the output processing unit 4 to perform communication using serial communication, such as UART/I2C/SPI, which does not directly control the communication protocol between the control unit 2 and the output processing unit 4 via the signal level.

Figures 3, 4:
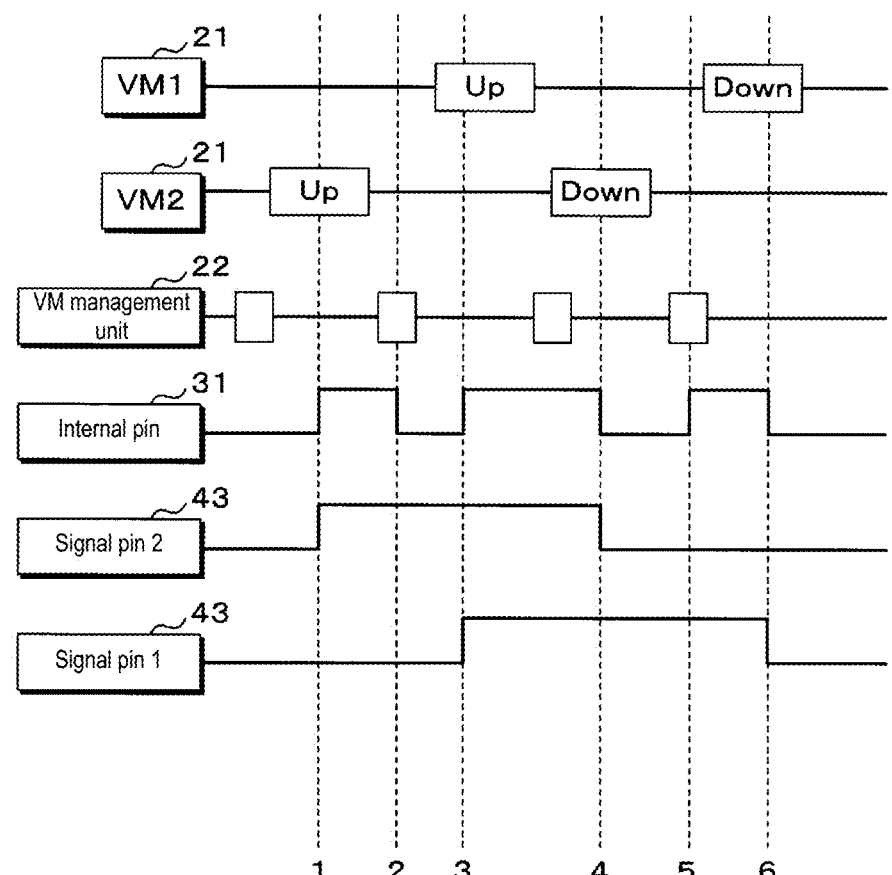
FIG. 3 is a diagram (or "VMID table") illustrating virtual environment information, such as VMIDs.
FIG. 4 is a diagram (timing chart) illustrating output states of an internal pin and a signal pin included in a vehicle-mounted apparatus.

FIG. 3 is a diagram (or "VMID table") useful in explaining virtual environment 21 information, such as VMIDs. As described earlier, the storage unit 5 of the vehicle-mounted apparatus 1 stores a management table (or "VMID table") for managing allocations (scheduling) of usage time (or "time slices") of physical resources, such as the internal pin 31 and the CPU, for each generated virtual environment 21 (VM). The control unit 2, which functions as the VM management unit 22, allocates (schedules) usage time of the internal pin 31, the CPU, and the like to each virtual environment 21 (VM) based on this VMID table.

As examples of managed fields, the VMID table includes "VMID", "program name", "allocated time", "signal pin number", and "actuator 101 name" fields. The "VMID" field stores an identification number (ID) for uniquely identifying a generated virtual environment 21 (VM). The "program name" field stores the name of a program that is to be executed using a virtual environment 21 (VM) with the corresponding VMID as the operating environment. The "allocated time" field stores a usage time (or time slice) of physical resources, such as the internal pin 31 and the CPU, for the corresponding VMID.

The "signal pin number" field stores the number of the signal pin 43 to which the actuator 101, which is the output destination of a control signal generated by the program executed in the virtual environment 21 with the corresponding VMID, is connected. The "actuator 101 name" field stores the name of the actuator 101 connected to the signal pin 43 with the corresponding signal pin number.

FIG. 4 is a diagram (timing chart) useful in explaining output states of the internal pin 31 and the signal pins 43 included in the vehicle-mounted apparatus 1.

In this timing chart, the horizontal axis indicates the passage of time, and the numbers indicated on the horizontal axis indicate numbers of states as time passes.

By launching a virtualized operating system, such as a hypervisor, stored in the storage unit 5, the control unit 2 functions as the VM management unit 22 of a virtualized operating system. The control unit 2, which functions as the VM management unit 22, generates a plurality of virtual environments 21 (VM1, VM2, and the like) based on a VMID table that has been set in advance for managing the virtual environments 21, and manages the generated virtual environments 21 by allocating usage time (or "time slices") of physical resources, such as the internal pin 31 and the CPU, to the virtual environments 21. Although two virtual environments 21 (VM1 and VM2) are illustrated in the drawings that accompany the present embodiment, it should be obvious that the number of virtual environments 21 is not limited to two and may be three or more.

The signal pins 43 are composed of two signal pins 43 (that is, a signal pin 43[1] and a signal pin 43[2]) that correspond to these two virtual environments 21 (VM1 and VM2). The signal pin 43[1] corresponds to the virtual environment 21 (VM1) and the signal pin 43[2] corresponds to the virtual environment 21 (VM2).

At the time indicated as "state 1", the virtual environment 21 (VM2) sets the internal pin 31 of the control unit 2 to high (that is, sets the signal level to high) so as to output a high-level control signal from the internal pin 31. As illustrated for the present embodiment, immediately before the time indicated as this state 1, the VM management unit 22 activates the virtual environment 21 (VM2) and allocates the internal pin 31, and additionally transmits the virtual environment 21 information to the output processing unit 4 so as to connect the signal pin 43[2], which corresponds to the virtual environment 21 (VM2), to the internal pin 31. By doing so, the high-level control signal that was output from the virtual environment 21 (VM2) is output from the signal pin 43[2].

At the time indicated as "state 2", the VM management unit 22 switches control from the virtual environment 21 (VM2) to the virtual environment 21 (VM1). That is, the VM management unit 22 activates the virtual environment 21 (VM1) and allocates the internal pin 31. The VM management unit 22 also makes a setting so that the signal from the output processing unit 4 is held. The VM management unit 22 restores the output of the internal pin 31 to the original state of the virtual environment 21 (VM1). In the present embodiment, restoring the output of the internal pin 31 to the original state of the virtual environment 21 (VM1) results in a low-level control signal being output from the internal pin 31. The output processing unit 4 holds the output state of the control signal output from the signal pin 43[2] corresponding to the virtual environment 21 (VM2) in keeping with the virtual environment 21 information output via the second internal pin 32 from the VM management unit 22. That is, even after control has switched to the virtual environment 21 (VM1), a state in which a high-level control signal is output from the signal pin 43[2] is maintained.

At the time indicated as "state 3", the virtual environment 21 (VM1) sets the internal pin 31 of the control unit 2 to high (that is, sets the signal level to high) so as to output a high-level control signal from the internal pin 31. By doing so, the high-level control signal that has been output from the virtual environment 21 (VM1) is output from the signal pin 43[1].

At the time indicated as "state 4", the virtual environment 21 (VM2) sets the internal pin 31 at low (that is, sets the signal level at low) so as to output a low-level control signal from the internal pin 31 of the control unit 2. Immediately before the time indicated as the state 4, the VM management unit 22 switches control from the virtual environment 21 (VM1) to the virtual environment 21 (VM2). Together with the switching of the virtual environment 21, the VM management unit 22 outputs the virtual environment 21 information to the output processing unit 4, to connect the internal pin 31 and the signal pin 43[2]. By doing so, the low-level control signal that was output from the virtual environment 21 (VM2) is output from the signal pin 43[2].

At the time indicated as "state 5", the VM management unit 22 switches control from the virtual environment 21 (VM2) to the virtual environment 21 (VM1). Together with the switching of the virtual environment 21, the VM management unit 22 outputs the virtual environment 21 information to the output processing unit 4 to connect the internal pin 31 and the signal pin 43[1].

At the time indicated as "state 6", the virtual environment 21 (VM1) sets the internal pin 31 of the control unit 2 at low (that is, sets the signal level at low) so as to output a low-level control signal from the internal pin 31. By doing so, the low control signal that was output from the virtual environment 21 (VM1) is output from the signal pin 43[1].

Figure 5:
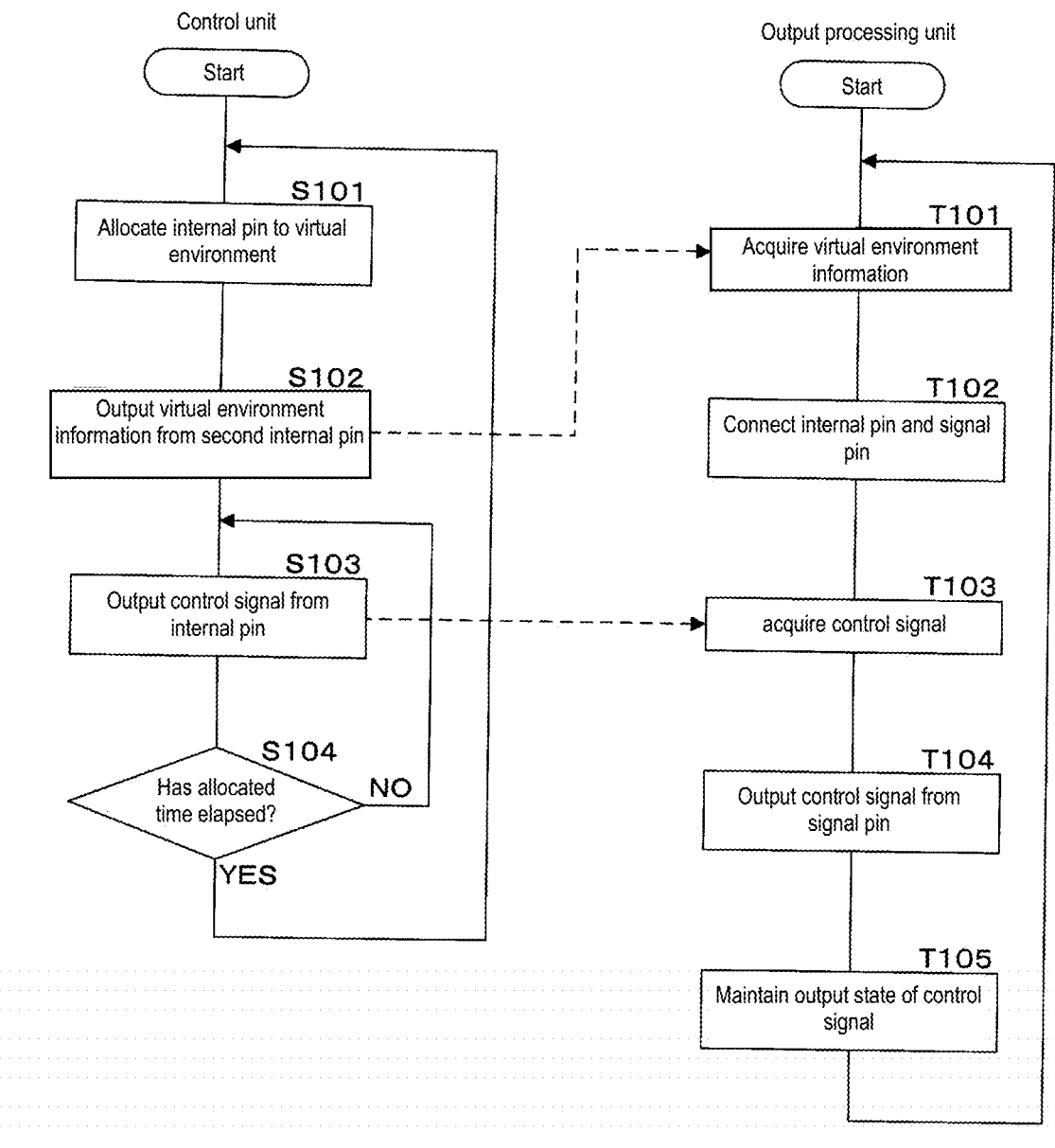
FIG. 5 is a flowchart depicting processing of a control unit and an output processing unit of a vehicle-mounted apparatus.

FIG. 5 is a flowchart depicting the processing of the control unit 2 and the output processing unit 4 of the vehicle-mounted apparatus 1. The control unit 2 and output processing unit 4 of the vehicle-mounted apparatus 1 regularly perform the processing described below when the vehicle C is in a startup state or a stopped state, for example.

The control unit 2 allocates the internal pin 31 to one of the virtual environments 21 (VM) by referencing the VMID table stored in the storage unit 5 (S101). The control unit 2 that has launched a virtualized operating system also functions as the VM management unit 22 of the virtualized operating system. By referencing the VMID table, the control unit 2 that functions as the VM management unit 22 identifies the virtual environment 21 to which the internal pin 31 is to be allocated at the present time and allocates the internal pin 31, which is a physical resource, to the identified virtual environment 21. When performing a process of allocating the internal pin 31 to a virtual environment 21, the control unit 2 (or specifically the VM management unit 22) may allocate the usage time (or a "time slice") of physical resources such as a CPU to that virtual environment 21 so as to run a virtual machine that is that virtual environment 21 and also allocate the internal pin 31. The control unit 2, which functions in this way as the VM management unit 22, manages the generated virtual environments 21 by allocating usage time (time slices) of physical resources, such as the internal pin 31 and the CPU, to the generated plurality of virtual environments 21.

The control unit 2 outputs the virtual environment 21 information (VMID), which relates to the virtual environment 21 (VM) to which the internal pin 31 is to be allocated, from the second internal pin 32 (S102). The control unit 2 that functions as the VM management unit 22 also outputs the virtual environment 21 information (VMID), which relates to the virtual environment 21 (VM) to which the internal pin 31 is currently allocated, via the second internal pin 32 to the output processing unit 4. The virtual environment 21 information referred to here is for example a VMID stored in a VMID table stored in the storage unit 5. Alternatively, the control unit 2 (or specifically the VM management unit 22) may output a signal pin number corresponding to the VMID as the virtual environment 21 information via the second internal pin 32 to the output processing unit 4.

The control unit 2 outputs a control signal, which has been generated by a program running in the virtual environment 21 (VM) to which the internal pin 31 is allocated, from the internal pin 31 (S103). In this way, the control unit 2 (VM management unit 22) allocates the internal pin 31, which is a physical resource, to the virtual environment 21 (VM), so that a control signal generated by a program running in the virtual environment 21 is output from the internal pin 31. That is, each program executed in a virtual environment 21 (VM) does not need to be conscious of (that is, avoid) control-related conflicts, such as the allocation of programs to the internal pin 31 (such as GPIO) that is the same physical resource. That is, it is not necessary to perform arbitration over I/O accesses to the internal pin 31 from different virtual environments 21 (VMs). By doing so, even if a program being executed using a virtual environment 21 as the operating environment is, for example, a program that originally ran on a vehicle-mounted ECU or the like and has been transferred (or "ported") to the vehicle-mounted apparatus 1, since the access rights to physical resources, such as the internal pin 31, can inherit the operating environment that was used by the vehicle-mounted ECU or the like, it is possible to eliminate the need to modify or alter the program when porting to the vehicle-mounted apparatus 1.

The control unit 2 determines whether the time allocated to the virtual environment 21 (VM) has elapsed (S104). As one example, by referring to the VMID table stored in the storage unit 5, the control unit 2 determines whether the allocated time for the virtual environment 21 (VM) to which the internal pin 31 is currently allocated has elapsed. Alternatively, when the operating times, that is, the usage time (or "time slices") of the CPU and the like of individual virtual environments 21 (VMs) have been defined in keeping with allocated times stored in the VMID table, a determination of whether the usage time of the CPU and the like has elapsed may be performed.

When the allocated time has not elapsed (S104: NO), the control unit 2 performs loop processing to execute the processing in S103 again. By doing so, the state where a control signal, which has been generated by the program being executed in the virtual environment 21 to which the internal pin 31 is currently allocated, is output from the internal pin 31 continues.

When the allocated time has elapsed (S104: YES), the control unit 2 performs loop processing to execute the processing in S101 again. By doing so, the internal pin 31 can be assigned to a virtual environment 21 (here, VM2) that is set in the VMID table with the next position (that is, next in order) following the virtual environment 21 (VM1) to which the internal pin 31 is currently assigned, and a control signal generated by a program running in that virtual environment 21 (VM2) can be output via the internal pin 31 to the output processing unit 4.

The output processing unit 4 acquires the virtual environment 21 information (VMID) from the control unit 2 (T101). The output processing unit 4 connects the internal pin 31 and a signal pin 43 according to the virtual environment 21 information (VMID) acquired from the control unit 2 (T102). The output processing unit 4 acquires the virtual environment 21 information, which includes a VMID or a signal pin number, from the control unit 2 via the second internal pin 32. According to this virtual environment 21 information, the output processing unit 4 can identify the signal pin 43 that corresponds to the control signal output via the internal pin 31. That is, based on the virtual environment 21 information acquired from the control unit 2, the output processing unit 4 performs processing, such as switching the connection between the internal pin 31 and the signal pins 43, using the switching management unit 41, which is constructed for example by a multiplexer. By doing so, the internal pin 31 and the signal pin 43 corresponding to the control signal output from the internal pin 31 are physically or logically connected. The output processing unit 4 acquires a control signal from the control unit 2 via the internal pin 31 (T103). The output processing unit 4 outputs the acquired control signal from the signal pin 43 (T104). The output processing unit 4 outputs the control signal, which has been acquired from the control unit 2 via the internal pin 31, from the signal pin 43 connected to the internal pin 31 using the switching management unit 41, which is a multiplexer or the like. The actuator 101 to be controlled by the control signal is connected to the signal pin 43 directly or via a harness such as a signal line. By doing so, the vehicle-mounted apparatus 1 can drive each actuator 101 according to control signals.

The output processing unit 4 maintains the output state of the control signal from the signal pin 43 (T105). The output processing unit 4 maintains (holds) the output state of the control signal from a signal pin 43 using a state holding unit 42, which is constructed of a flip-flop or the like. By doing so, the output state of a control signal output from a signal pin 43 is maintained until the next outputting of virtual environment 21 information (VMID) corresponding to that signal pin 43 from the control unit 2. That is, the output state of the control signal from a signal pin 43 is maintained even while the internal pin 31 is connected to another signal pin 43. By doing so, the vehicle-mounted apparatus 1 can continue driving the actuator 101 in accordance with the control signal.

Note that the embodiments disclosed herein are to be considered as illustrative and non-limiting in all aspects. The scope of the present disclosure is indicated by the range of the claims, not the description given above, and is intended to include all changes within the meaning and scope of the claims and their equivalents.

The invention claimed is:

1. A vehicle-mounted apparatus that is mounted in a vehicle and is connected to a plurality of actuators,
the vehicle-mounted apparatus comprising:
a storage unit for storing a plurality of programs, which individually correspond to the plurality of actuators;
a control unit for generating control signals for controlling the actuators;
an output processing unit for outputting the control signals, which have been generated by the control unit, via signal pins to which the plurality of actuators are connected, and
at least one internal pin that connects the control unit and the output processing unit and transmits the control signals,
wherein the internal pins are fewer in number than the signal pins; and
wherein the control unit generates a plurality of virtual environments and executes the plurality of programs with the generated plurality of virtual environments as operating environments, and wherein the control unit switches an allocation of the internal pins between the plurality of virtual environments, and outputs a control signal generated by a program executed in a virtual environment to which the internal pins have been allocated.

2. The vehicle-mounted apparatus according to claim 1, wherein the output processing unit acquires the control signals output from the control unit via the internal pins, and
the output processing unit outputs an acquired control signal from the signal pin to which an actuator, which is an output destination of the control signal, is connected.

3. The vehicle-mounted apparatus according to claim 1, a virtualized operating system stored in the storage unit, which is launched by the control unit,
wherein the control unit generates the plurality of virtual environments by launching the virtualized operating system, executes the plurality of programs with the generated plurality of virtual environments as operating environments, and outputs the control signals that have been generated by the plurality of programs.

4. The vehicle-mounted apparatus according to claim 1, wherein the control unit outputs virtual environment information which indicates a virtual environment to which the internal pins are allocated, and
the output processing unit identifies the signal pin that is to output the acquired control signal based on the virtual environment information output from the control unit, and outputs the control signal from the identified signal pin.

5. The vehicle-mounted apparatus according to claim 4, wherein the output processing unit holds an output state of the control signal from the identified signal pin based on the virtual environment information.

6. The vehicle-mounted apparatus according to claim 4, wherein a second internal pin for transmitting the virtual environment information is provided between the control unit and the output processing unit.

7. The vehicle-mounted apparatus according to claim 1, wherein the output processing unit is composed of a hardware processing unit including a logic circuit.

8. The vehicle-mounted apparatus according to claim 1, wherein the signal pins or the internal pins are composed of general purpose inputs/outputs (GPIO).

9. A program causing a computer, which is mounted in a vehicle, is connected to a plurality of actuators, and includes a control unit for generating control signals for controlling the actuators, an output processing unit for outputting the control signals, which have been generated by the control unit, via signal pins to which the plurality of actuators are connected, and internal pins that connect the control unit and the output processing unit, transmit the control signals, and are fewer in number than the signal pins, to execute processing,
the processing comprising:
causing the control unit to output the control signals via the internal pins; and
causing the output processing unit to output a control signal acquired via the internal pins from the signal pin to which an actuator, which is an output destination of the control signal, is connected; and
causing the control unit to generate a plurality of virtual environments and executes a plurality of programs with the generated plurality of virtual environments as operating environments, and wherein the control unit switches an allocation of the internal pins between the plurality of virtual environments, and outputs a control signal generated by a program executed in a virtual environment to which the internal pins have been allocated.

10. An information processing method for causing a computer, which is mounted in a vehicle, is connected to a plurality of actuators, and includes a control unit for generating control signals for controlling the actuators, an output processing unit for outputting the control signals, which have been generated by the control unit, via signal pins to which the plurality of actuators are connected, and internal pins that connect the control unit and the output processing unit, transmit the control signals, and are fewer in number than the signal pins, to execute processing, the processing comprising:

causing the control unit to output the control signals via the internal pins; and causing the output processing unit to output a control signal acquired via the internal pins from the signal pin to which an actuator, which is an output destination of the control signal, is connected; and causing the control unit to generate a plurality of virtual environments and executes a plurality of programs with the generated plurality of virtual environments as operating environments, and wherein the control unit switches an allocation of the internal pins between the plurality of virtual environments, and outputs a control signal generated by a program executed in a virtual environment to which the internal pins have been allocated.

* * * * *